US010354238B2

(12) United States Patent
Yoshimura

(10) Patent No.: US 10,354,238 B2
(45) Date of Patent: Jul. 16, 2019

(54) INFORMATION PROCESSING APPARATUS, INFORMATION PROCESSING METHOD, AND STORAGE MEDIUM

(71) Applicant: FUJI XEROX CO., LTD., Tokyo (JP)

(72) Inventor: Toshihide Yoshimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 574 days.

(21) Appl. No.: 14/675,988

(22) Filed: Apr. 1, 2015

(65) Prior Publication Data

US 2016/0071073 A1    Mar. 10, 2016

(30) Foreign Application Priority Data

Sep. 5, 2014    (JP) ................................. 2014-181207

(51) Int. Cl.
*G06Q 20/10*    (2012.01)
*G06Q 20/40*    (2012.01)

(52) U.S. Cl.
CPC ......... *G06Q 20/102* (2013.01); *G06Q 20/405* (2013.01)

(58) Field of Classification Search
CPC ........ G06Q 20/04; G06Q 20/10; G06Q 20/40; G06Q 20/405
USPC ........................................................ 705/40
See application file for complete search history.

(56) References Cited

U.S. PATENT DOCUMENTS

| | | | | |
|---|---|---|---|---|
| 6,032,133 | A | * | 2/2000 | Hilt ........................ G06Q 20/02 705/40 |
| 2013/0238748 | A1 | | 9/2013 | Sakahira et al. |
| 2013/0325707 | A1 | * | 12/2013 | Joa ........................ G06Q 40/02 705/40 |

FOREIGN PATENT DOCUMENTS

| | | |
|---|---|---|
| JP | 2007-179202 A | 7/2007 |
| JP | 2008-033647 A | 2/2008 |
| WO | 2011129144 A1 | 10/2011 |
| WO | 2014049803 A1 | 4/2014 |

OTHER PUBLICATIONS

Communication dated Sep. 11, 2018, issued by the Japan Patent Office in corresponding application No. 2014-181207.

* cited by examiner

*Primary Examiner* — Robert R Niquette
*Assistant Examiner* — Liz P Nguyen
(74) *Attorney, Agent, or Firm* — Sughrue Mion, PLLC

(57) ABSTRACT

An information processing apparatus includes a memory that stores first data indicating an overview of billing or payment of money regarding a user, and second data indicating a specification of at least a part of the first data; a first generating unit that generates first image information which represents the first data before a request for the first image information being input; and a second generating unit that generates second image information which represents the second data in response to a request for the second image information being input.

18 Claims, 15 Drawing Sheets

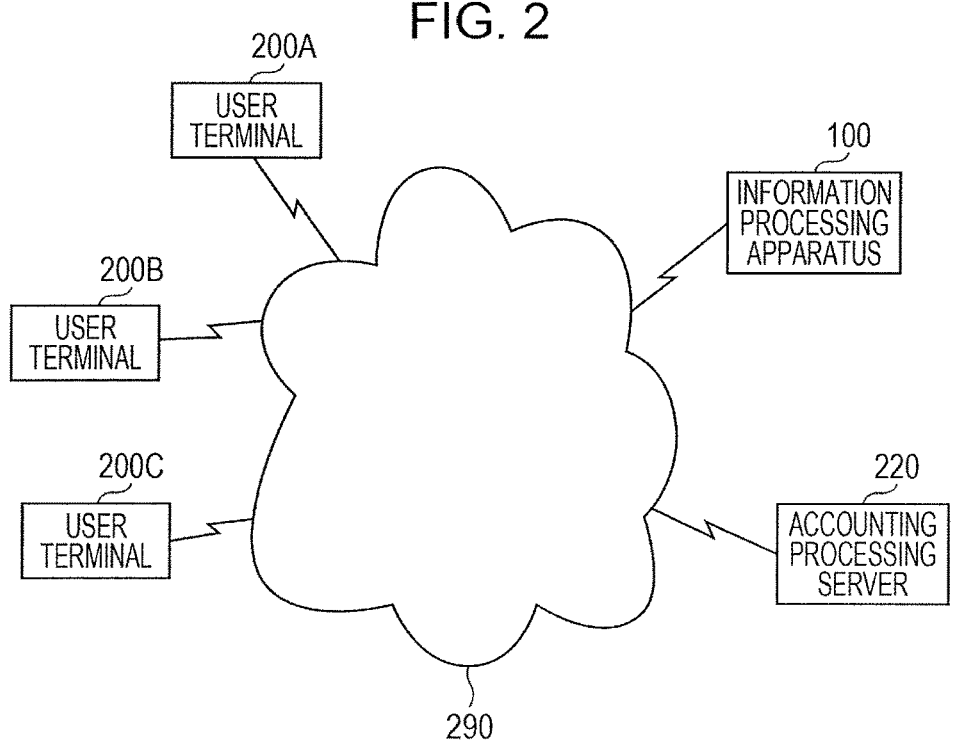
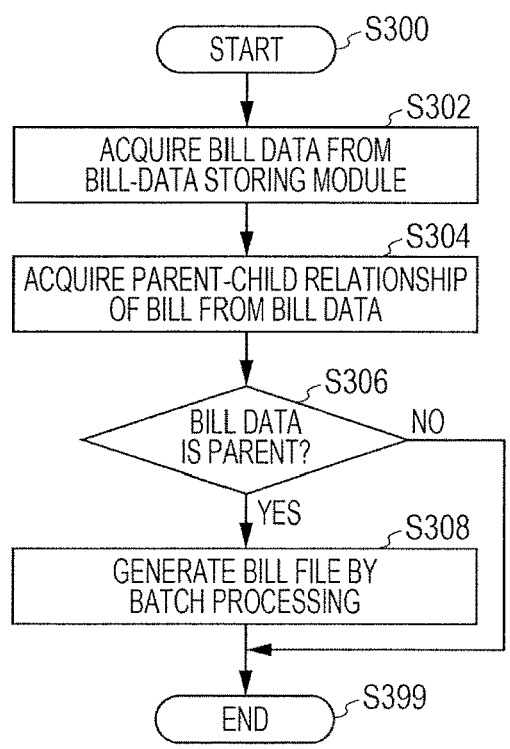

FIG. 11A
1100

| | BILL DATA FIELD | BILL DATA VALUE |
|---|---|---|
| 1102 | BILL NUMBER | 100000-0000001 |
| 1104 | ISSUE DATE | 03 / 09 / 2014 |
| 1106 | BILLING AMOUNT | 112,545 YEN |
| 1108 | SPECIFICATION NUMBER | 100000-0000002, 100000-0000003, 100000-0000004 |
| 1110 | SPECIFICATION AMOUNT OF MONEY | 14,882 YEN, 13,589 YEN, 84,074 YEN |
| | ... | ... |

FIG. 11B
1120

| | SPECIFICATION DATA FIELD | SPECIFICATION DATA VALUE |
|---|---|---|
| 1122 | SPECIFICATION NUMBER | 100000-0000002, |
| 1124 | SERVICE NUMBER | S0001-01 |
| 1126 | SPECIFICATION AMOUNT OF MONEY | 14,882 YEN |
| | ... | |

FIG. 11C
1130

| | SPECIFICATION DATA FIELD | SPECIFICATION DATA VALUE |
|---|---|---|
| 1132 | SPECIFICATION NUMBER | 100000-0000003, |
| 1134 | SERVICE NUMBER | S0002-01892245 |
| 1136 | SPECIFICATION AMOUNT OF MONEY | 13,589 YEN |
| | ... | |

FIG. 11D
1140

| | SPECIFICATION DATA FIELD | SPECIFICATION DATA VALUE |
|---|---|---|
| 1142 | SPECIFICATION NUMBER | 100000-0000004, |
| 1144 | SERVICE NUMBER | S0003-01 |
| 1146 | SPECIFICATION AMOUNT OF MONEY | 84,074 YEN |
| | ... | |

| THRESHOLD DATA FIELD | THRESHOLD DATA VALUE |
|---|---|
| SERVICE NUMBER | S0003-01 |
| SPECIFICATION THRESHOLD | 50,000 YEN |
| ... | ... |

1202 SERVICE NUMBER
1204 SPECIFICATION THRESHOLD

| USER-OPERATION RECORD FIELD | USER-OPERATION RECORD VALUE |
|---|---|
| USER ID | yamada |
| OPERATION TIME | 3/12/2014 19:06 |
| OPERATION PAGE | billing/S0003-01_details |
| PAGE SPECIFICATION AMOUNT OF MONEY | 48,245 YEN |
| OPERATION CONTENT | DISPLAY |
| ... | ... |

1302 USER ID
1304 OPERATION TIME
1306 OPERATION PAGE
1308 PAGE SPECIFICATION AMOUNT OF MONEY
1310 OPERATION CONTENT

FIG. 14

| BILL DATA FIELD | BILL DATA VALUE |
|---|---|
| BILL NUMBER | 100000-0000001 |
| ISSUE DATE | 05 / 10 / 2014 |
| BILLING AMOUNT | 27,188 YEN |
| SPECIFICATION NUMBER | 100000-0000002, 100000-0000003 |
| SPECIFICATION AMOUNT OF MONEY | 14,882 YEN, 13,589 YEN |
| ... | ... |

FIG. 15

| BILL DATA FIELD | BILL DATA VALUE |
|---|---|
| BILL NUMBER | 100123-0000001 |
| ISSUE DATE | 6 / 10 / 2014 |
| BILLING AMOUNT | 44,039 YEN |
| SPECIFICATION NUMBER | 100123-0000002, 100123-0000003 100123-0000004 100123-0000005 100123-0000006 |
| SPECIFICATION AMOUNT OF MONEY | 12,450 YEN, 11,305 YEN 10,200 YEN 8,884 YEN 1,200 YEN |
| ... | ... |

FIG. 18

BILL LIST

CUSTOMER NO.: 1234-5678
LAST UPDATE DATE: 3/10/2014 9:00

AAA CORPORATION
BB, CC

| BACK TO BILLING RELATED TOP | | | | |
|---|---|---|---|---|
| No | BILL NAME | UPDATE DATE ▼ | LAST DOWNLOAD DATE | |
| ⊞ 1 | 2014/2 BILL | 3/10/2014 8:00 | | DOWNLOAD |
| 1-1 | 2014/2 BILL SERVICE A SPECIFICATION | 3/10/2014 8:00 | | DOWNLOAD  SPECIFICATION COLLECTIVE DOWNLOAD |
| 1-2 | 2014/2 BILL SERVICE B SPECIFICATION | 3/10/2014 8:00 | | DOWNLOAD |
| ⊟ 4 | ********.txt | ******** | | DOWNLOAD  SPECIFICATION COLLECTIVE DOWNLOAD |
| ⊟ 5 | ********.csv | ******** | | DOWNLOAD  SPECIFICATION COLLECTIVE DOWNLOAD |

1  NEXT

INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2014-181207 filed Sep. 5, 2014.

BACKGROUND

The present invention relates to an information processing apparatus, an information processing method, and a storage medium.

SUMMARY

According to an aspect of the invention, there is provided an information processing apparatus including a memory that stores first data indicating an overview of billing or payment of money regarding a user, and second data indicating a specification of at least a part of the first data; a first generating unit that generates first image information which represents the first data before a request for the first image information being input; and a second generating unit that generates second image information which represents the second data in response to a request for the second image information being input.

BRIEF DESCRIPTION OF THE DRAWINGS

An exemplary embodiment of the present invention will be described in detail based on the following figures, wherein:

FIG. 2 is an explanatory illustration showing a system configuration example when this exemplary embodiment is implemented;

FIG. 3 is a flowchart showing a processing example according to this exemplary embodiment;

FIGS. 11A to 11D are explanatory illustrations showing a data structure example of a bill data table, a specification data table, and other tables;

FIG. 12 is an explanatory illustration showing a data structure example of a threshold master table;

FIG. 13 is an explanatory illustration showing a data structure example of a user-operation record table;

FIG. 14 is an explanatory illustration showing a data structure example of a bill data table;

FIG. 15 is an explanatory illustration showing a data structure example of a bill data table;

FIG. 18 is an explanatory illustration showing a display example of a bill download designation screen.

DETAILED DESCRIPTION

An exemplary embodiment desirable for implementing the invention is described below with reference to the drawings.

Figure 1:
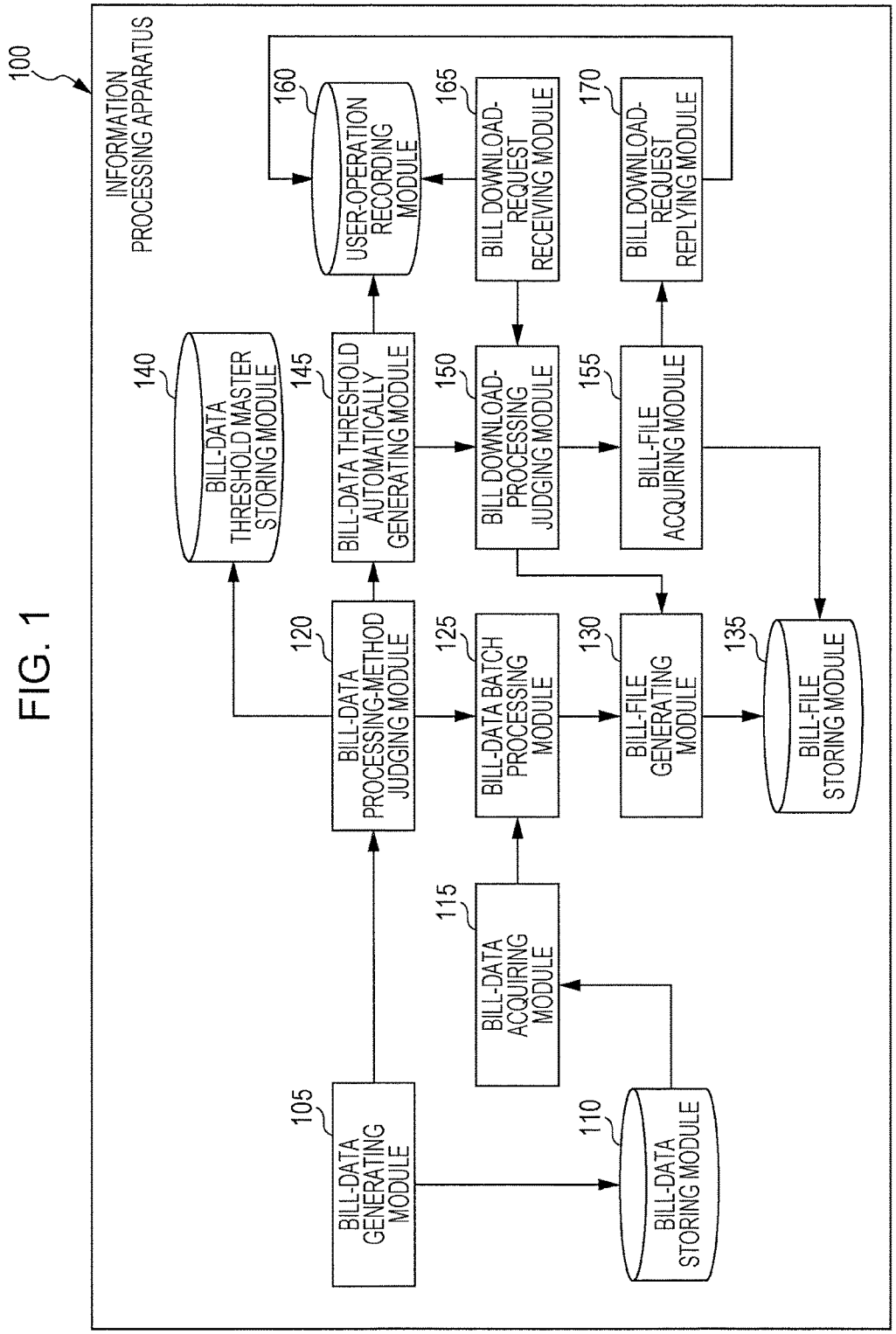
FIG. 1 is a conceptual module configuration diagram for a configuration example of an exemplary embodiment.

FIG. 1 is a conceptual module configuration diagram showing a configuration example according to this exemplary embodiment.

A module represents a component, such as software (a computer program) or hardware, which may be generally logically separated. Hence, a module in this exemplary embodiment represents not only a module being a computer program, but also a module being a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a memory to store . . . or controlling a memory to store . . . in the case in which the exemplary embodiment is a computer program. Also, modules may correspond to functions one by one. However, when being mounted or installed, a single module may be formed of a single program, plural modules may be formed of a single program, or a single module may be formed of plural programs. Also, plural modules may be executed by a single computer, or a single module may be executed by plural computers in a distributed or parallel environment. A single module may include other module. Also, "connection" is used for physical connection, and logical connection (for example, transmission and reception of data, an instruction, or reference relationship among data). An expression "predetermined" represents being determined before target processing. The situation includes a situation before processing according to this exemplary embodiment is started, and a situation even after processing according to this exemplary embodiment is started as long as the situation is before target processing. In other words, the expression "predetermined" is used as being determined in accordance with the condition and state of the current situation, or the condition and state of the previous situation. If there are plural "predetermined values," the values may be different, or two or more values (of course, all the values) may be the same. Also, an expression "if A, do B" is used as "determining whether A or not, and doing B if it is determined as A," unless otherwise the determination whether A or not is not required.

Also, a system or an apparatus includes a case in which a system or an apparatus is formed of plural computers, hardware, plural devices, etc., connected by a communication measure such as a network (including communication connection in a one-to-one correspondence), and a case in which a system or an apparatus is provided by a single computer, hardware, a single device, etc. "An apparatus" and "a system" are used as mutually equivalent words. Of course, "a system" does not include a social "scheme" (social system) that is merely an artificial agreement.

Also, target information is read from a memory every processing of each module or every processing if plural steps of processing are executed in a module, and after the processing, the processing result is written out to the memory. Hence, the description of reading from the memory before the processing and writing out to the memory after the processing may be occasionally omitted. In this case, a memory may include a hard disk, a random access memory (RAM), an external storage medium, a memory arranged via a communication line, and a register in a central processing unit (CPU).

An information processing apparatus 100 according to this exemplary embodiment generates display information for displaying information indicating billing or payment of money. As shown in an example in FIG. 1, the information processing apparatus 100 includes a bill-data generating module 105, a bill-data storing module 110, a bill-data acquiring module 115, a bill-data processing-method judging module 120, a bill-data batch processing module 125, a bill-file generating module 130, a bill-file storing module 135, a bill-data threshold master storing module 140, a bill-data threshold automatically generating module 145, a bill download-processing judging module 150, a bill-file acquiring module 155, a user-operation recording module 160, a bill download-request receiving module 165, and a bill download-request replying module 170.

In the following example, display (generally corresponding to generation of a bill etc.) for information (hereinafter, also referred to as bill data) indicating billing of money is used. However, display (generally corresponding to generation of a note of payment etc.) for information indicating payment of money may be also similarly used.

The bill-data generating module 105 is connected with the bill-data storing module 110 and the bill-data processing-method judging module 120. The bill-data generating module 105 causes the bill-data storing module 110 to store bill data from other information processing apparatus (generally, a system that manages billing or payment of money called core system, for example, an accounting processing server 220 shown in an example in FIG. 2). The bill-data may be generated and/or stored at intervals (for example, monthly or weekly). Also, when bill data is stored in the bill-data storing module 110, the bill-data generating module 105 notifies the bill-data processing-method judging module 120 about that the bill data is newly registered.

The bill-data storing module 110 is connected with the bill-data generating module 105 and the bill-data acquiring module 115. The bill-data storing module 110 is a database for bill data.

The bill-data acquiring module 115 is connected with the bill-data storing module 110 and the bill-data batch processing module 125. The bill-data acquiring module 115 acquires bill data from the bill-data storing module 110.

The bill-data processing-method judging module 120 is connected with the bill-data generating module 105, the bill-data batch processing module 125, the bill-data threshold master storing module 140, and the bill-data threshold automatically generating module 145. The bill-data processing-method judging module 120 receives first data indicating an overview of billing or payment of money and second data indicating a specification of the first data. Hereinafter, it is assumed that the first data and the second data have a parent-child relationship. The first data is the parent, and the second data is the child. To be specific, for example, the first data being the parent corresponds to information indicating an overview of billing or payment relating to a product or a service provided for a constant period (for example, on a monthly basis) to a certain customer, or more particularly the total sum of the amounts of billing or payment. The first data may include the billing amount for each product or service. The second data being the child corresponds to a specification of billing written in the first data. For example, the second data includes information relating to a specific usage situation (for example, the use amount of data, the printout number of sheets, or the period of conversation) of the product or service. The second data may be provided individually for each product or service, or may collectively include information of plural products or services. In the case of the first data being the parent, the bill-data batch processing module 125 performs its processing. In the case of the second data being the child, the bill download-processing judging module 150 generates display information for displaying second data when a display request for the second data is made. It is to be noted that the display request includes a request for displaying on a display, a request for download, a request for printing, etc. The display information may be an image file or image information which represents an invoice or a receipt regarding the first data and the second data.

To be specific, the bill-data processing-method judging module 120 judges whether batch processing is performed or not from bill data that is newly registered in the bill-data storing module 110, based on a condition (for example, the parent-child relationship of a bill, the billing amount, or the operation history of a user). When the batch processing is performed, the bill-data batch processing module 125 is called.

The method of generating a bill file is divided for a case of batch processing and a case of on-demand processing under a predetermined condition and processing is performed, so that a form-file saving region in the information processing apparatus 100 is decreased, and the download speed from a client is maintained. For the condition, the following items are used.

(1) Parent-Child Relationship of Bill

In many cases, a bill has a parent-child relationship. For example, there may be a configuration including a parent bill in which an overview of billing is written and plural child bills (specifications) indicating specifications of respective items written in the overview. Also, a user typically browses the overview of billing; however, in many cases, does not browse the specification. Hence, only a parent bill file is previously generated by batch processing, and a child bill file is generated on demand when a display request for the specification is made.

(2) Parent-Child Relationship of Bill and Billing Amount

As described in (1), a user typically browses the overview of billing; however, in many cases, does not browse the specification. However, in a bill charged on a monthly basis, an item in the specification of the bill (for example, the column of the total sum (total billing amount)) may be changed depending on the month. The user may likely browse the specification for the item if the billing amount of the item exceeds a predetermined level. Hence, the amount of money that may cause the user to reference the specification is assumed as a threshold and is defined as a master for each item. If the amount exceeds the threshold, the corresponding specification file is previously generated as batch processing.

(3) Parent-Child Relationship of Bill, Billing Amount, and User Monitoring Result The method described in (2) has a preparatory threshold in the information processing apparatus 100. However, since the threshold may be actually different depending on the sense of money of the user, it is difficult to set the threshold that meets the intention of the user. Hence, an item and a billing amount that cause the user to display the specification thereof are recorded, and the threshold is actively determined with reference to the statistical information. The collection range (scope) of the information may be any type of an individual user, users classified to the same industry category etc., and all users, or may be determined with regard to all types of users.

(4) Difference from Previous Month in Number of Billing Items or Total Billing Amount in Bill In a case of a monthly bill, the number of billing items is increased or decreased depending on the month. A user likely browses the specification in a case of a month with a large difference from the previous month in the number of billing items or the total billing amount. Hence, if the difference from the previous month in the number of billing items or the total billing amount is changed more than a threshold, a specification file is previously generated as batch processing.

(5) Difference from Previous Month in Number of Billing Items and Total Billing Amount in Bill, and User Monitoring Result The method described in (4) has a preparatory threshold in the information processing apparatus 100. However, since the threshold may be actually different depending on the preferences of the user or the item, it is difficult to set the threshold that meets the intention of the user. Hence, an item and a change in the number of billing items or the total billing amount that cause the user to display the specification thereof are recorded, and the threshold is actively determined with reference to the statistical information. The collection scope of the information may be any type of an individual user, users classified to the same industry category etc., and all users, or may be determined with regard to all types of users.

Selective Use of (1) to (3)

For a bill having a feature that the billing amount is not markedly monthly changed, since the cost for referencing and calculating the thresholds in (2) and (3) is wasted, the information processing apparatus 100 may automatically select the method (1). If a case in which the threshold less likely varies after the monitoring method is employed, or a case in which the threshold less likely varies as the result of monitoring executed for a predetermined period is detected, the information processing apparatus 100 may automatically select the method (2).

Selective Use of (1) to (3) and (4) to (5)

When a bill is divided into an overview of billing and a specification (with a parent-child relationship), the method of (1) to (3) is used. When a bill is not divided into an overview of billing and a specification and the overview of billing and the specification are included in the single bill (without a parent-child relationship), the method of (4) to (5) is used. The information processing apparatus 100 may also automatically select the method.

Combination of (1) to (3) and (4) to (5)

When billing data is not assigned to batch processing by the method of (1) to (3), assignment to batch processing may be performed by combining processing of (4) to (5). Detailed processing is described later with reference to a flowchart in an example in FIG. 10.

Information Collection Scope for Monitoring (Individual, Classified Users, all Users)

Monitoring is executed for an individual, classified users, or all users for a predetermined period, and a deviation (variation) of the threshold is calculated from the monitoring result. It is assumed that a threshold with a small deviation is useful for the scope. Also, the information processing apparatus 100 may automatically revise the collection scope every predetermined period.

The bill-data batch processing module 125 is connected with the bill-data acquiring module 115, the bill-data processing-method judging module 120, and the bill-file generating module 130. The bill-data batch processing module 125 previously generates display information for displaying first data before a display request for the first data is made. "Before a display request is made" represents batch processing. The generated display information is stored in the bill-file storing module 135. The generation timing in this case may be any timing as long as the timing is before a display request is made. In general, generation processing is performed when first data is received. Then, when a display request is made, the generation of the display information is not started at that timing, but the bill-file acquiring module 155 extracts the corresponding display information from the bill-file storing module 135.

Also, if the amount of money of a predetermined item in first data or second data is higher than or equal to or higher than a predetermined amount of money, the bill-data batch processing module 125 previously generates display information for displaying the second data before a display request for the second data is made. In this case, "a predetermined item" may be, for example, a column of the total amount of money.

Also, if a parent-child relationship is not present, and if the difference between the number of items or the amount of money of a predetermined item in information relating to billing or payment of money, and the number of items or the amount of money of the predetermined item in the past is larger than or equal to or larger than a predetermined threshold, the bill-data batch processing module 125 previously generates display information for displaying the information before a display request for the information is made. The difference is between (1) the number of items in information relating to billing or payment of money being a subject and the number of items in the past, or the difference between (2) the amount of money of a predetermined item in information relating to billing or payment of money and the amount of money of the predetermined item in the past. In this case, the bill-data threshold automatically generating module 145 may calculate "a predetermined threshold" that is used for processing by the bill-data batch processing module 125 by statistical processing on the number of items or the amount of money of a predetermined item obtained in response to a display request in the past for the information.

To be specific, the bill-data batch processing module 125 reads bill data asynchronously, calls the bill-file generating module 130, and hence performs file generation.

The bill-file generating module 130 is connected with the bill-data batch processing module 125, the bill-file storing module 135, and the bill download-processing judging module 150. The bill-file generating module 130 generates a bill file from bill data. A bill file is a document being a bill, and is, for example, an image file that is generated by transferring data relating to an overview or a specification of billing or payment to a predetermined form. A format may be, for example, the portable Document format (PFD), or a Web page. In this exemplary embodiment, the bill file is also called display information.

The bill-file storing module 135 is connected with the bill-file generating module 130 and the bill-file acquiring module 155. The bill-file storing module 135 is a saving device for a bill file that is generated by the bill-file generating module 130.

The bill-data threshold master storing module 140 is connected with the bill-data processing-method judging module 120. The bill-data threshold master storing module 140 stores a master that defines a threshold for the amount of money with which a billing specification is referenced for each item (for example, each service item).

The bill-data threshold automatically generating module 145 is connected with the bill-data processing-method judging module 120, the bill download-processing judging module 150, and the user-operation recording module 160. The bill-data threshold automatically generating module 145 calculates "a predetermined amount of money" that is used as a condition under which the bill-data batch processing module 125 performs processing, by statistical processing on the amount of money of a predetermined item obtained in response to a display request in the past for second data. In this case, the statistical processing is, for example, processing of calculating an average value, a median value, or the most frequent value.

To be specific, the bill-data threshold automatically generating module 145 compiles individual data of a user (information relating to operation history) from the user-operation recording module 160, performs statistical processing, and generates a threshold for the amount of money with which the billing specification is referenced for each item. To be specific, for example, when the average of the billing amounts of a service or a product, the display request for the specification of which was made in the past by a certain user (or users who belong to a certain scope) is 20,000 yen, the threshold to be generated is 20,000 yen. This represents that, if the billing amount for the product or service in a certain month of the user (or the users who belong to the scope) is 20,000 yen or higher or higher than 20,000 yen, display information for the specification of the product or service is generated by batch before the user makes a display request.

The bill download-processing judging module 150 is connected with the bill-file generating module 130, the bill-data threshold automatically generating module 145, the bill-file acquiring module 155, and the bill download-request receiving module 165. The bill download-processing judging module 150 generates display information for displaying second data after a display request for the second data is made.

The bill download-processing judging module 150 generates display information for displaying information, display information of which has not been generated by the bill-data batch processing module 125, after a display request for the information is made.

To be specific, the bill download-processing judging module 150 specifies a corresponding bill in response to a request for bill download. If a bill file is present, the bill download-processing judging module 150 makes a reply to the bill download-request replying module 170. If a bill file is not present, the bill download-processing judging module 150 calls the bill-file generating module 130 to generate a bill file, and makes a reply to the bill download-request replying module 170 after the generation of the file.

The bill-file acquiring module 155 is connected with the bill-file storing module 135, the bill download-processing judging module 150, and the bill download-request replying module 170. The bill-file acquiring module 155 acquires a bill file from the bill-file storing module 135 in response to an instruction from the bill download-processing judging module 150.

The bill download-request receiving module 165 is connected with the bill download-processing judging module 150 and the user-operation recording module 160. The bill download-request receiving module 165 receives a request for bill download from a client (an information processing terminal operated by a user, or a user terminal 200 shown in an example in FIG. 2). The operation relating to the request is recorded in the user-operation recording module 160.

The bill download-request replying module 170 is connected with the bill-file acquiring module 155 and the user-operation recording module 160. The bill download-request replying module 170 returns a reply (including a bill file) for bill download to the client. The history of reply processing is recorded in the user-operation recording module 160. The client displays the bill file.

The user-operation recording module 160 is connected with the bill-data threshold automatically generating module 145, the bill download-request receiving module 165, and the bill download-request replying module 170. The user-operation recording module 160 is a database that records a Web page requested by the user for download, data of a bill file, and the operation history.

FIG. 2 is an explanatory illustration showing a system configuration example when this exemplary embodiment is implemented.

The information processing apparatus 100, a user terminal 200A, a user terminal 200B, a user terminal 200C, and an accounting processing server 220 are connected with each other through a communication line 290. The communication line 290 may be wireless, wired, or a combination of these. For example, the communication line 290 may be the Internet serving as a communication infrastructure. The information processing apparatus 100 is configured as a server. The user terminal 200 is a terminal that is used by a user who uses the information processing apparatus 100. For example, the user terminal 200 corresponds to a personal computer having installed therein a Web browser, or a portable information terminal (which may be a mobile phone including a smartphone). The accounting processing server 220 performs accounting processing relating to a product purchased or a service used by a user or the like of the user terminal 200. The accounting processing server 220 provides bill data to the information processing apparatus 100.

FIG. 3 is a flowchart showing a processing example according to this exemplary embodiment. This shows a flow for performing batch processing if bill data is the parent. In step S300, the processing is started.

In step S302, bill data is acquired from the bill-data storing module 110.

In step S304, the parent-child relationship of a bill is acquired from the bill data.

In step S306, it is determined whether the bill data is the parent or not. If the bill data is the parent, the processing goes to step S308. Otherwise, the processing is ended (step S399).

In step S308, a bill file is generated by batch processing.

Figure 4:
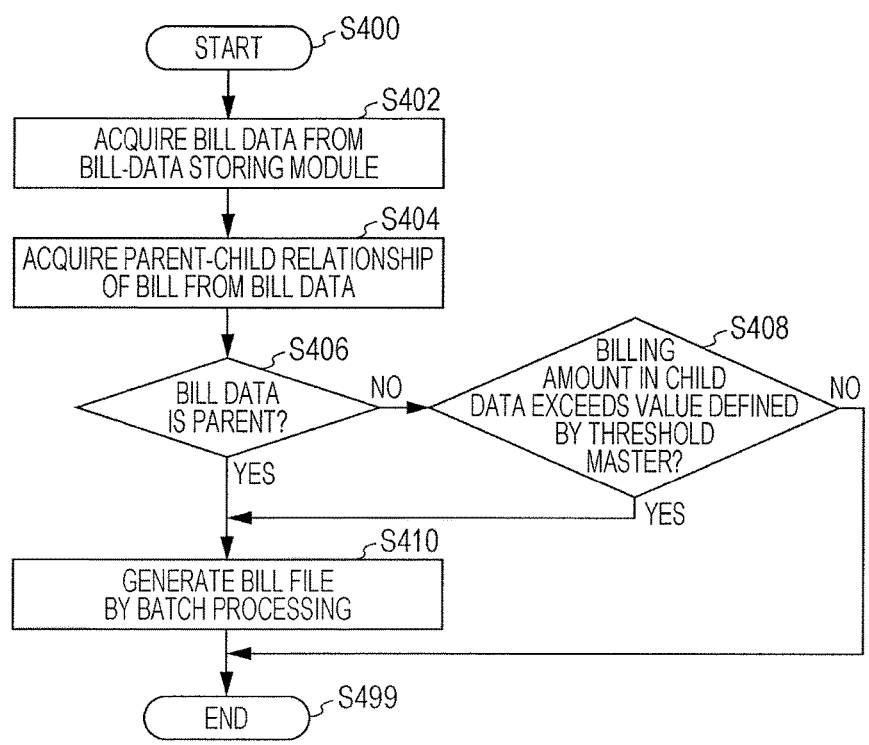
FIG. 4 is a flowchart showing a processing example according to this exemplary embodiment.

FIG. 4 is a flowchart showing a processing example according to this exemplary embodiment. This shows a flow for performing batch processing if the bill data is the parent, or if bill data is the child and the billing amount in the child data exceeds a predefined threshold. In step S400, the processing is started.

In step S402, bill data is acquired from the bill-data storing module 110.

In step S404, the parent-child relationship of a bill is acquired from the bill data.

In step S406, it is determined whether the bill data is the parent or not. If the bill data is the parent, the processing goes to step S410. Otherwise, the processing goes to step S408.

In step S408, it is determined whether or not the billing amount in the child data exceeds a value defined by a threshold master. If the billing amount exceeds the defined value, the processing goes to step S410. Otherwise, the processing is ended (step S499).

In step S410, a bill file is generated by batch processing.

Figure 5:
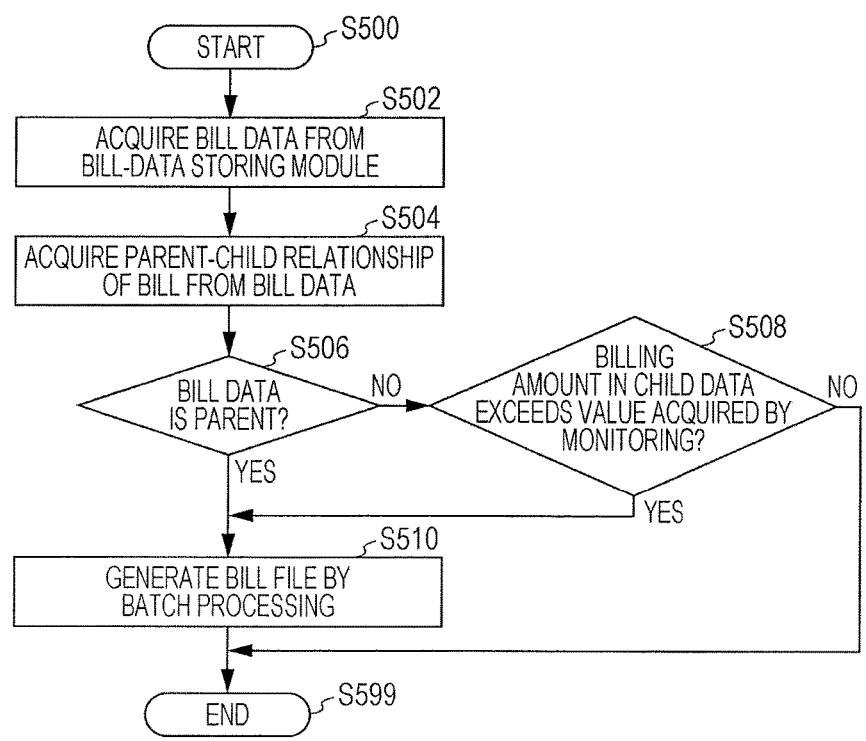
FIG. 5 is a flowchart showing a processing example according to this exemplary embodiment.

FIG. 5 is a flowchart showing a processing example according to this exemplary embodiment. This shows a flow for performing batch processing if the bill data is the parent, or if bill data is the child and the billing amount acquired by user monitoring exceeds a threshold. In step S500, the processing is started.

In step S502, bill data is acquired from the bill-data storing module 110.

In step S504, the parent-child relationship of a bill is acquired from the bill data.

In step S506, it is determined whether the bill data is the parent or not. If the bill data is the parent, the processing goes to step S510. Otherwise, the processing goes to step S508.

In step S508, it is determined whether or not the billing amount in the child data exceeds a threshold acquired by monitoring. If the billing amount exceeds the threshold, the processing goes to step S510. Otherwise, the processing is ended (step S599).

In step S510, a bill file of first data and second data relating to a product or a service, the billing amount of which exceeds the threshold, is generated by batch processing.

Figure 6:
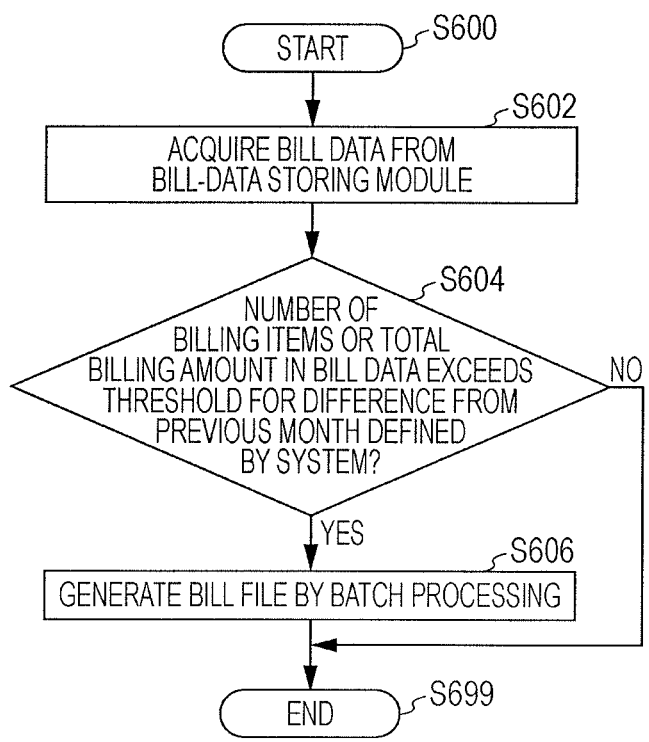
FIG. 6 is a flowchart showing a processing example according to this exemplary embodiment.

FIG. 6 is a flowchart showing a processing example according to this exemplary embodiment. This shows a flow for performing batch processing if the number of billing items or the total billing amount in bill data of first data exceeds a predefined threshold. In step S600, the processing is started.

In step S602, bill data of first data is acquired from the bill-data storing module 110.

In step S604, it is determined whether or not the number of billing items or the total billing amount in the bill data exceeds a threshold for the difference from the previous month defined by a system (the information processing apparatus 100). If the number of billing items or the total billing amount exceeds the threshold, the processing goes to step S606. Otherwise, the processing is ended (step S699).

In step S606, a bill file relating to first data and second data is generated by batch processing.

Figure 7:
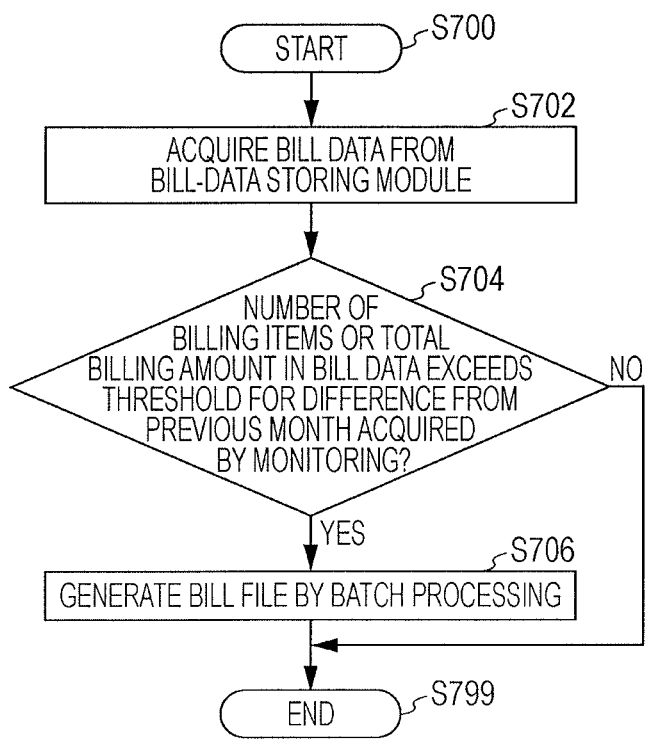
FIG. 7 is a flowchart showing a processing example according to this exemplary embodiment.

FIG. 7 is a flowchart showing a processing example according to this exemplary embodiment. This shows a flow for performing batch processing if the number of billing items or the total billing amount in bill data exceeds a threshold obtained by user monitoring. In step S700, the processing is started.

In step S702, bill data is acquired from the bill-data storing module 110.

In step S704, it is determined whether or not the number of billing items or the total billing amount in the bill data exceeds a threshold for the difference from the previous month acquired by monitoring. If the number of billing items or the total billing amount exceeds the threshold, the processing goes to step S706. Otherwise, the processing is ended (step S799).

In step S706, a bill file is generated by batch processing.

Figure 8:
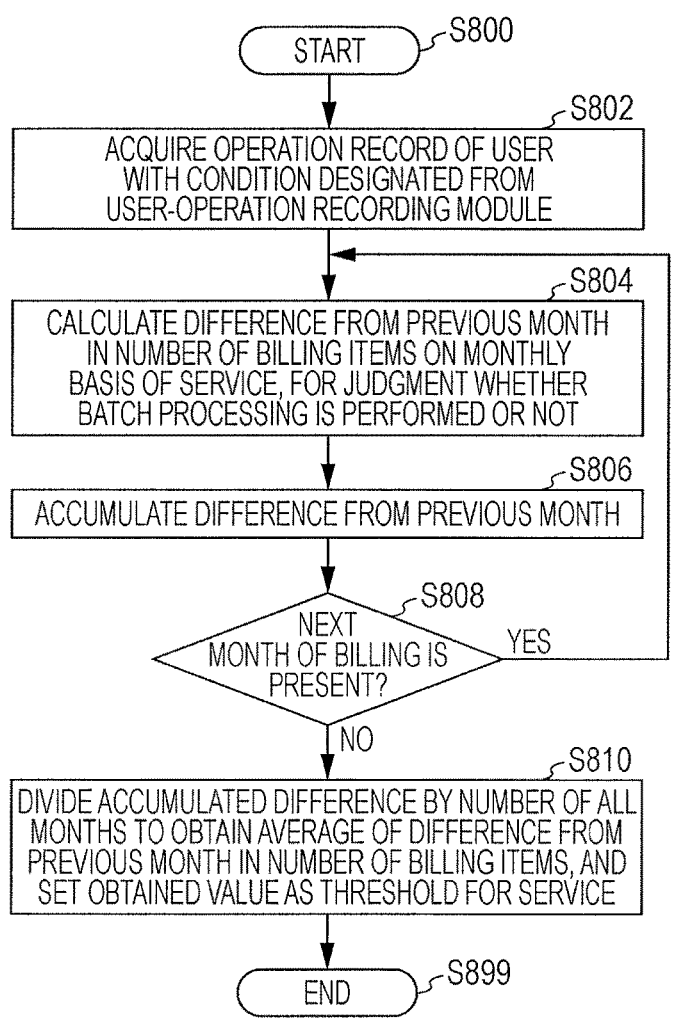
FIG. 8 is a flowchart showing a processing example according to this exemplary embodiment.

FIG. 8 is a flowchart showing a processing example according to this exemplary embodiment. This shows a flow for obtaining an average value of the difference from the previous month in the number of billing items in bill data from a user-operation record, and determining the threshold for the item. In step S800, the processing is started.

In step S802, an operation record of a user, the condition of which is designated, is acquired from the user-operation recording module 160.

In step S804, the difference from the previous month in the number of billing items on a monthly basis of a service is calculated, for judgment whether batch processing is performed or not.

In step S806, the difference from the previous month is accumulated.

In step S808, it is determined whether the next month of billing is present or not. If the next month of billing is present, the processing returns to step S804. Otherwise, the processing goes to step S810.

In step S810, the accumulated difference is divided by the number of all months to obtain an average of the difference from the previous month in the number of billing items, and the obtained value is set as a threshold for the service (item). In step S899, the processing is ended.

Figure 9:
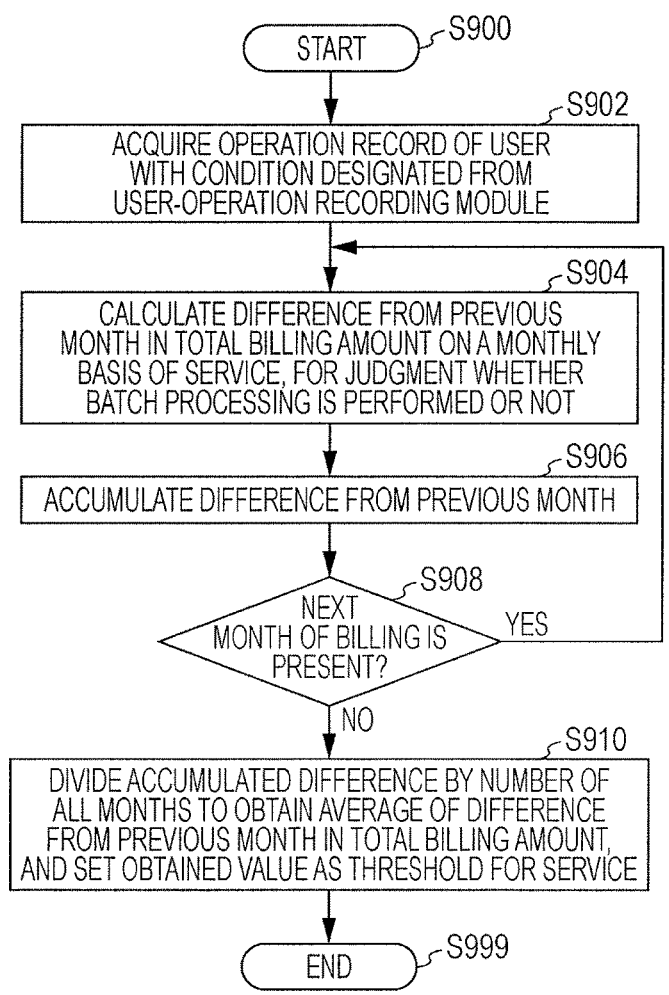
FIG. 9 is a flowchart showing a processing example according to this exemplary embodiment.

FIG. 9 is a flowchart showing a processing example according to this exemplary embodiment. This shows a flow for obtaining an average value of the difference from the previous month in the total billing amount in bill data from a user-operation record, and determining the threshold for the item. In step S900, the processing is started.

In step S902, an operation record of a user, the condition of which is designated, is acquired from the user-operation recording module 160.

In step S904, the difference from the previous month on a monthly basis in the total billing amount for a service (item) is calculated, for judgment whether batch processing is performed or not.

In step S906, the difference from the previous month is accumulated.

In step S908, it is determined whether the next month of billing is present or not. If the next month of billing is present, the processing returns to step S904. Otherwise, the processing goes to step S910.

In step S910, the accumulated difference is divided by the number of all months to obtain an average of the difference from the previous month in the total billing amount, and the obtained value is set as a threshold for the service (item). In step S999, the processing is ended.

Figure 10:
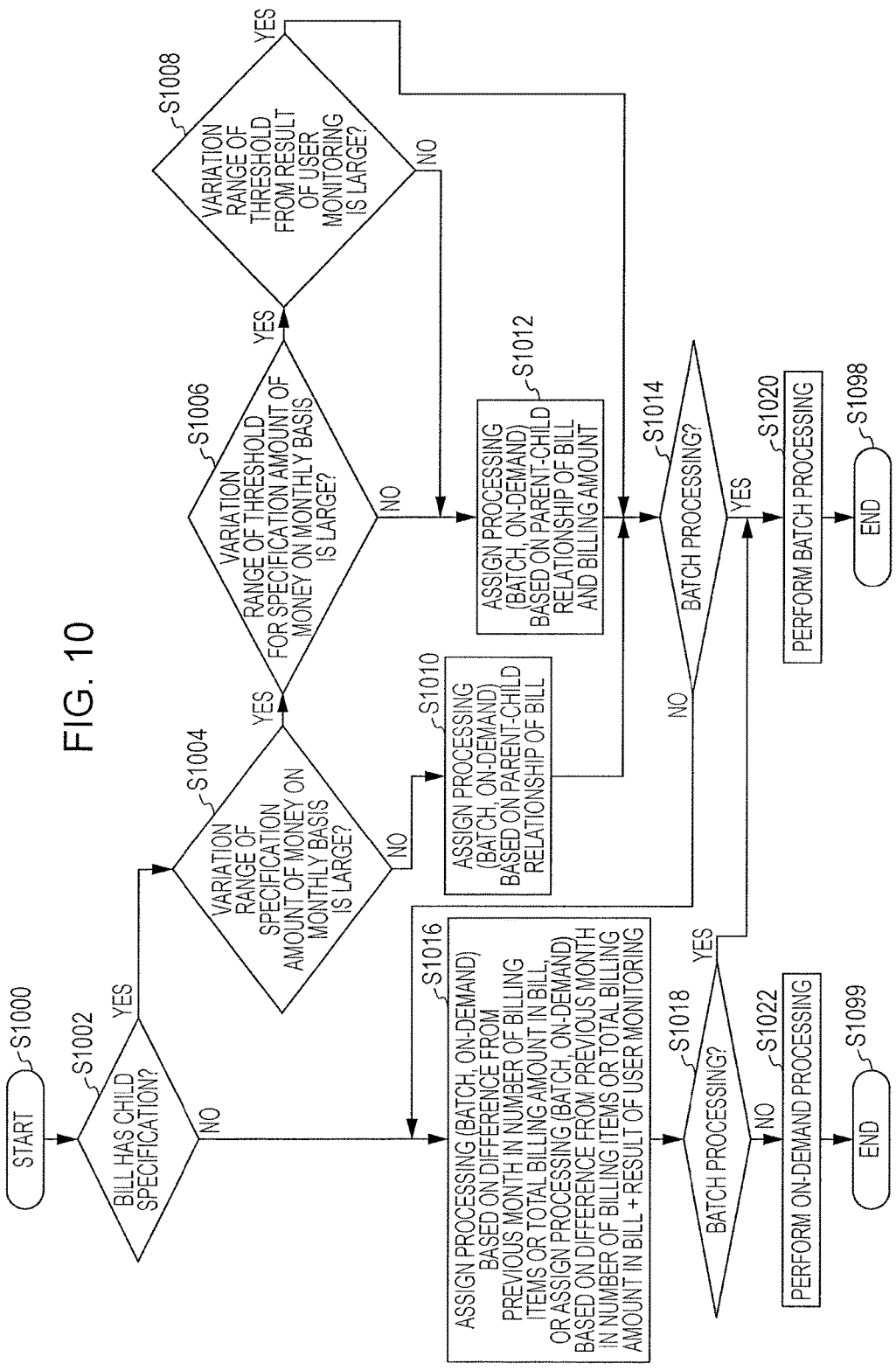
FIG. 10 is a flowchart showing a processing example according to this exemplary embodiment.

FIG. 10 is a flowchart showing a processing example according to this exemplary embodiment. This shows a flow for determining assignment of the above-described processing (1) to (5). In step S1000, the processing is started.

In step S1002, it is determined whether a bill has a child specification or not. If the bill has a child specification, the processing goes to step S1004. Otherwise, the processing goes to step S1016.

In step S1004, it is determined whether or not the variation range of the specification amount of money on a monthly basis is large. If the variation range is large, the processing goes to step S1006. Otherwise, the processing goes to step S1010.

In step S1006, it is determined whether or not the variation range of the threshold for the specification amount of money on a monthly basis is large. If the variation range is large, the processing goes to step S1008. Otherwise, the processing goes to step S1012.

In step S1008, it is determined whether or not the variation range of the threshold is large from the result of user monitoring. If the variation range is large, the processing goes to step S1014. Otherwise, the processing goes to step S1012.

In step S1010, processing is assigned (batch, on-demand) based on the parent-child relationship of the bill.

In step S1012, processing is assigned (batch, on-demand) based on the parent-child relationship of the bill and the billing amount.

In step S1014, it is determined whether processing is batch processing or not. If the processing is batch processing, the processing goes to step S1020. Otherwise, the processing goes to step S1016.

In step S1016, processing is assigned (batch, on-demand) based on the difference from the previous month in the number of billing items or the total billing amount in the bill. Or, processing is assigned (batch, on-demand) based on the difference from the previous month in the number of billing items or the total billing amount in the bill+the result of user monitoring.

In step S1018, it is determined whether processing is batch processing or not. If the processing is batch processing, the processing goes to step S1020. Otherwise, the processing goes to step S1022.

In step S1020, batch processing is performed.

In step S1022, on-demand processing is performed.

The order of steps S1004, S1006, and S1008 may be any order, or these steps may be performed in parallel. However, it is desirable to perform steps S1004, S1006, and S1008 in that order in view of the relationship of processing amount. The processing amount for making determination is decreased in that order. In step S1098 or step S1099, the processing is ended.

FIGS. 11A to 11D are explanatory illustrations showing a data structure example of a bill data table 1100, a specification data table 1120, and other tables stored in the bill-data storing module 110. The pair of the bill data table 1100 and the specification data table 1120, the pair of the bill data table 1100 and a specification data table 1130, and the pair of the bill data table 1100 and a specification data table 1140 each have a parent-child relationship.

FIG. 11A is an explanatory illustration showing a data structure example of the bill data table 1100. The bill data table 1100 has a bill number column 1102, an issue date column 1104, a billing amount column 1106, a specification number column 1108, and a specification amount of money column 1110. The bill number column 1102 stores a bill number of a bill. The issue date column 1104 stores the issue date of the bill. The billing amount column 1106 stores the billing amount in the bill. The specification number column 1108 stores a specification number (a number having a pointer function with respect to the specification data table 1120 etc.) of the billing amount. The specification amount of money column 1110 stores a specification amount of money which is the detail of the billing amount.

The specification data table 1120, the specification data table 1130, and the specification data table 1140 are data indicating detailed specifications.

FIG. 11B is an explanatory illustration showing a data structure example of the specification data table 1120. The specification data table 1120 has a specification number column 1122, a service number column 1124, and a specification amount of money column 1126. The specification number column 1122 stores a specification number. The service number column 1124 stores a service number (item number). The specification amount of money column 1126 stores the specification amount of money of the item.

FIG. 11C is an explanatory illustration showing a data structure example of the specification data table 1130.

The specification data table 1130 has a specification number column 1132, a service number column 1134, and a specification amount of money column 1136.

The specification number column 1132 stores a specification number. The service number column 1134 stores a service number (item number). The specification amount of money column 1136 stores the specification amount of money of the item.

FIG. 11D is an explanatory illustration showing a data structure example of the specification data table 1140.

The specification data table 1140 has a specification number column 1142, a service number column 1144, and a specification amount of money column 1146.

The specification number column 1142 stores a specification number. The service number column 1144 stores a service number (item number). The specification amount of money column 1146 stores the specification amount of money of the item.

FIG. 12 is an explanatory illustration showing a data structure example of a threshold master table 1200 stored in the bill-data threshold master storing module 140.

The threshold master table 1200 has a service number column 1202 and a specification threshold column 1204. The service number column 1202 stores a service number (item number). The specification threshold column 1204 stores the threshold (specification threshold) of the item. In FIG. 12, in a case of an item "S0003-01," if the item is higher than "50,000 yen," the item may be a subject of batch processing.

FIG. 13 is an explanatory illustration showing a data structure example of a user-operation record table 1300 stored in the user-operation recording module 160.

The user-operation record table 1300 has a user ID column 1302, an operation time column 1304, an operation page column 1306, a page specification amount of money column 1308, and an operation content column 1310. The user ID column 1302 stores information for uniquely identifying a user (user ID, identification) according to this exemplary embodiment. The operation time column 1304 stores the time (year, month, day, hour, minute, second, and unit shorter than second, or a combination of these) at which the user made the operation. The operation page column 1306 stores the page with the operation made by the user. The page specification amount of money column 1308 stores the specification amount of money on the page. The page specification amount of money column 1308 is an item that is added to a log of a general operation record. The case represents that the user browses the detailed specification in the case of this amount of money, t. The operation content column 1310 stores the content of the operation made by the user.

The description is given below with reference to examples in FIGS. 11A to 13.

Example of Judgment Based on Parent-Child Relationship of Bill File

The bill data table 1100 (parent data) is previously generated as a bill file by batch processing based on the parent-child relationship of the bill data table 1100 shown in the example in FIG. 11A, with respect to the specification data table 1120, the specification data table 1130, and the specification data table 1140 shown in the example in FIGS. 11B to 11D.

Example of Judgment Based on Parent-Child Relationship of Bill File and Billing Amount The bill data table 1100 (parent data) is previously generated as a bill file by batch processing based on the parent-child relationship of the bill data table 1100 shown in the example in FIG. 11A, with respect to the specification data table 1120, the specification data table 1130, and the specification data table 1140 shown in the example in FIGS. 11B to 11D. Further, with reference to the threshold of the corresponding service in the threshold master table 1200 shown in the example in FIG. 12, since the specification amount of money of a service number S0003-01 of a specification number 100000-0000004 exceeds 50,000 yen which is the threshold, the specification data table 1140 shown in the example of FIG. 11D is previously generated as a bill file by batch processing.

Example of Judgment Based on Parent-Child Relationship of Bill File, Billing Amount, and Result of User Monitoring The bill data table 1100 (parent data) is previously generated as a bill file by batch processing based on the parent-child relationship of the bill data table 1100 shown in the example in FIG. 11A, with respect to the specification data table 1120, the specification data table 1130, and the specification data table 1140 shown in the example in FIGS. 11B to 11D. Further, the number of times the detailed page with the service number of each specification is opened is compiled from the user-operation record table 1300 shown in the example in FIG. 13, and the average value of the specification amount of money in this case is calculated.

For example, the specification with the service number S0003-01 is referenced 100 times by all users, and the average value of these specification amounts of money is calculated as 50,000 yen. In this case, it is assumed that users likely open the specification with the service number S0003-01 of the specification number 100000-0000004 with a high probability. Hence, the specification data table 1140 shown in the example in FIG. 11D is also previously generated as a bill file by batch processing.

FIG. 14 is an explanatory illustration showing a data structure example of a bill data table 1400 stored in the bill-data storing module 110. The bill data table 1400 has a bill number column 1402, an issue date column 1404, a billing amount column 1406, a specification number column 1408, and a specification amount of money column 1410. The bill number column 1402 stores a bill number. The issue date column 1404 stores an issue date. The billing amount column 1406 stores a billing amount. The specification number column 1408 stores a specification number. The specification amount of money column 1410 stores a specification amount of money.

FIG. 15 is an explanatory illustration showing a data structure example of a bill data table 1500 stored in the bill-data storing module 110. The bill data table 1500 has a bill number column 1502, an issue date column 1504, a billing amount column 1506, a specification number column 1508, and a specification amount of money column 1510. The bill number column 1502 stores a bill number. The issue date column 1504 stores an issue date. The billing amount column 1506 stores a billing amount. The specification number column 1508 stores a specification number. The specification amount of money column 1510 stores a specification amount of money.

Figure 16:
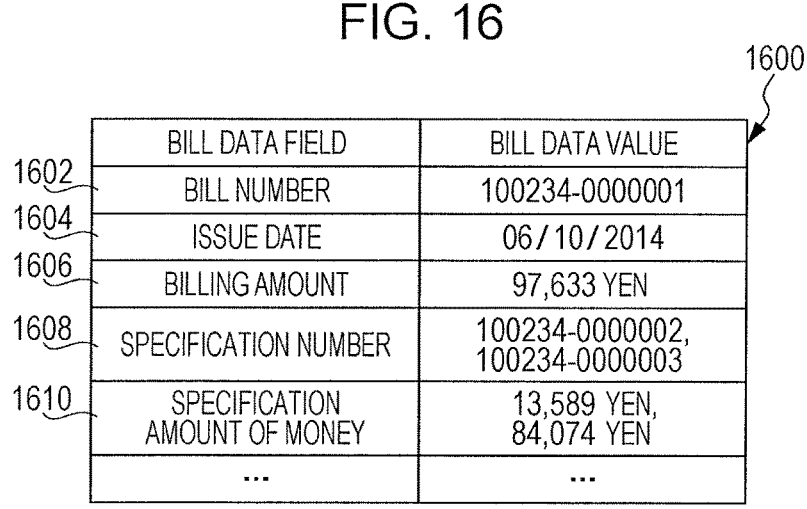
FIG. 16 is an explanatory illustration showing a data structure example of a bill data table.

FIG. 16 is an explanatory illustration showing a data structure example of a bill data table 1600 stored in the bill-data storing module 110. The bill data table 1600 has a bill number column 1602, an issue date column 1604, a billing amount column 1606, a specification number column 1608, and a specification amount of money column 1610. The bill number column 1602 stores a bill number. The issue date column 1604 stores an issue date. The billing amount column 1606 stores a billing amount. The specification number column 1608 stores a specification number. The specification amount of money column 1610 stores a specification amount of money.

The bill data table 1400, the bill data table 1500, and the bill data table 1600 each have a structure equivalent to the above-described bill data table 1100. However, there is no parent-child relationship among the bill data table 1400, the bill data table 1500, and the bill data table 1600.

Figure 17:
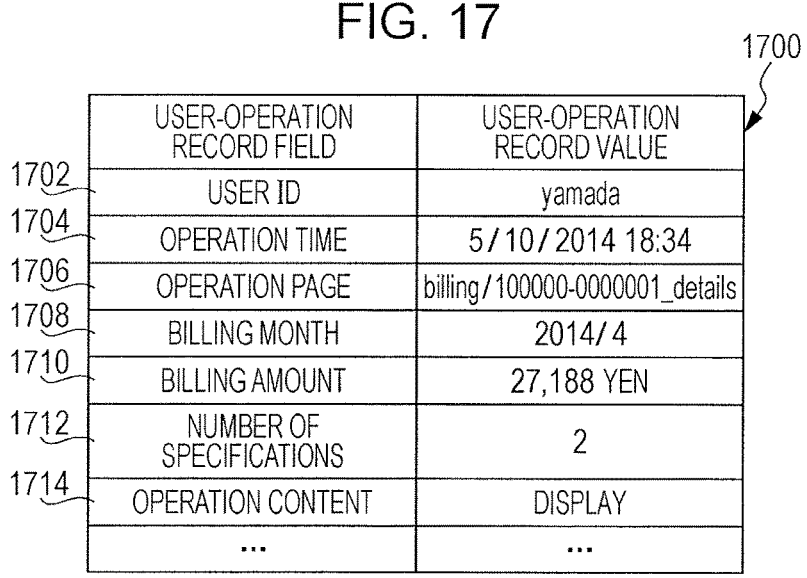
FIG. 17 is an explanatory illustration showing a data structure example of a user-operation record table.

FIG. 17 is an explanatory illustration showing a data structure example of a user-operation record table 1700 stored in the user-operation recording module 160.

The user-operation record table 1700 has a user ID column 1702, an operation time column 1704, an operation page column 1706, a billing month column 1708, a billing amount column 1710, a number of specifications column 1712, and an operation content column 1714. The user ID column 1702 stores a user ID. The operation time column 1704 stores an operation time. The operation page column 1706 stores an operation page. The billing month column 1708 stores a billing month. The billing amount column 1710 stores a billing amount. The number of specifications column 1712 stores the number of specifications. The operation content column 1714 stores an operation content.

The user-operation record table 1700 has the billing month column 1708, the billing amount column 1710, and the number of specifications column 1712 instead of the page specification amount of money column 1308 as compared with the user-operation record table 1300.

The description is given below with reference to examples in FIGS. 14 to 17.

Example of Judgment Based on Difference from Previous Month in the Number of Billing Items in Bill File The difference in the number of billing items from the previous month between the bill data table 1400 shown in the example in FIG. 14 and the bill data table 1500 shown in the example in FIG. 15 is 3. When the information processing apparatus 100 sets the threshold of the difference in the number of billing items from the previous month at 3, the bill data table 1500 shown in the example in FIG. 15 is previously generated as a bill file by batch processing.

Example of Judgment Based on Difference from Previous Month in Total Billing Amount in Bill File The difference in the total billing amount from the previous month between the bill data table 1400 shown in the example in FIG. 14 and the bill data table 1600 shown in the example in FIG. 16 is 70,445 yen. When the information processing apparatus 100 sets the threshold of the difference in the total billing amount from the previous month at 50,000 yen, the bill data table 1600 shown in the example in FIG. 16 is previously generated as a bill file by batch processing.

Example of Judgment Based on Difference from Previous Month in the Number of Billing Items in Bill File and User Monitoring The difference in the number of billing items from the previous month between the bill data table 1400 shown in the example in FIG. 14 and the bill data table 1500 shown in the example in FIG. 15 is 3. The difference from the previous month on a monthly basis, the specification of which is browsed, is compiled from the user-operation record table 1700 shown in the example in FIG. 17, and the average value is calculated.

For example, when the average of the differences from the previous month in the number of billing items on a monthly basis, the specification of which is browsed, is 2.5 for all users, it is assumed that the users likely open the bill data table 1500 shown in the example in FIG. 15 with a high probability. Hence, the bill data table 1500 is also previously generated as a bill file by batch processing.

Example of Judgment Based on Difference from Previous Month in Total Billing Amount in Bill File and User Monitoring The difference in the total billing amount from the previous month between the bill data table 1400 shown in the example in FIG. 14 and the bill data table 1600 shown in the example in FIG. 16 is 70,445 yen. The difference from the previous month on a monthly basis, the specification of which is browsed, is compiled from the user-operation record table 1700 shown in the example in FIG. 17, and the average value is calculated.

For example, when the average of the differences from the previous month in the total billing amount on a monthly basis, the specification of which is browsed, is 50,000 yen for all users, it is assumed that the users likely open the bill data table 1600 shown in the example in FIG. 16 with a high probability. Hence, the bill data table 1600 is also previously generated as a bill file by batch processing.

FIG. 18 is an explanatory illustration showing a display example of a bill download designation screen 1800 of the user terminal 200.

The bill download designation screen 1800 is a page for a list of bills. The bill download designation screen 1800 has displayed thereon a No. column 1810, a bill name column 1820, an update date column 1830, a last download date column 1840, and a download instruction column 1850.

A parent bill row 1862 serves as a parent, and a child bill row 1864 and a child bill row 1866 serve as children. When a "download" button in the parent bill row 1862 is selected by an operation by a user, a bill is downloaded. However, bills (specifications) of the child bill row 1864 and the child bill row 1866 serving as the children are not a subject of download. When a "specification collective download" button in the parent bill row 1862 is selected by an operation by the user, the bill as well as the bills (the specifications) in the child bill row 1864 and the child bill row 1866 are collectively downloaded. When the "download" button in the child bill row 1864 is selected by an operation by the user, the bill (the specification) is downloaded.

In the example of the judgment based on the parent-child relationship of the bill file, when the "download" button in the parent bill row 1862 is selected by the operation by the user, the bill after the batch processing (previously generated bill) is downloaded. When the "specification collective download" button in the parent bill row 1862 is selected by the operation by the user, the bill after the batch processing (the previously generated bill) and the bills (the specifications) in the child bill row 1864 and the child bill row 1866 generated after the button is selected (after a display request is made) are downloaded.

Figure 19:
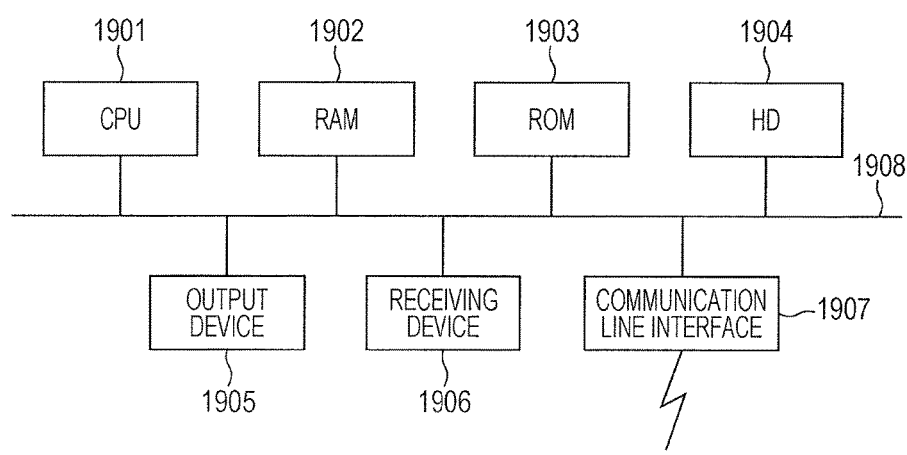
FIG. 19 is a block diagram showing a hardware configuration example of a computer that implements the exemplary embodiment.

A hardware configuration of a computer that executes a program according to this exemplary embodiment is a typical computer as exemplarily shown in FIG. 19, and specifically a computer or the like that may serve as a personal computer or a server. That is, for specific example, a computer uses a CPU 1901 as a processing unit (an arithmetic operation unit), and a RAM 1902, a ROM 1903, and an HD 1904 as memories. For example, a hard disk or a solid state drive (SSD) may be used as the HD 1904. The computer includes the CPU 1901 that executes programs of, for example, the bill-data generating module 105, the bill-data acquiring module 115, the bill-data processing-method judging module 120, the bill-data batch processing module 125, the bill-file generating module 130, the bill-data threshold automatically generating module 145, the bill download-processing judging module 150, the bill-file acquiring module 155, the bill download-request receiving module 165, and the bill download-request replying module 170; the RAM 1902 that stores the programs and data; the ROM 1903 that stores, for example, a program for booting this computer; the HD 1904 serving as an auxiliary memory (alternatively, the HD 1904 may be, for example, flash memory); a receiving device 1906 that receives data in accordance with an operation by a user on a keyboard, a mouse, a touch panel, etc.; an output device 1905, such as a CRT or a liquid crystal display; a communication line interface 1907, such as a network interface card, for connection to a communication network; and a bus 1908 that connects the above-described units for transmission and reception of data. Multiple such computers may be connected through a network.

In the above-described exemplary embodiment, configurations provided by computer programs are implemented as the exemplary embodiment by causing a system with the hardware configuration to read the computer programs being software and by causing the software and hardware resources to cooperate to each other.

The hardware configuration shown in FIG. 19 is a mere configuration example. The configuration of this exemplary embodiment is not limited to the configuration shown in FIG. 19, and may be any configuration as long as the modules described in this exemplary embodiment may be executed. For example, a part of the modules may be formed of dedicated hardware (for example, application specific integrated circuit, ASIC, or the like), a part of the modules may be arranged in an external system and may be connected through a communication line, and further the system shown in FIG. 19 may be multiple systems mutually connected through a communication line and the multiple systems may operate in an associated manner. Alternatively, in particular, a part of the modules may be arranged in any of a home information appliance, a copier, a facsimile, a scanner, a printer, and a multiple-function device (an image processing apparatus having at least two functions of a scanner, a printer, a copier, and a facsimile), instead of a personal computer.

In the above-described exemplary embodiment, the difference from the previous month is used; however, at least comparison may be made between the amount of money in the past and the amount of money in a subject period (generally, the current month). For example, comparison may be made between the amount of money in the previous same month and that in the current month, or between the amount of money in the previous quarter and that in the current quarter.

The described program may be stored in a storage medium and provided. Alternatively, the program may be provided by a communication measure. In this case, for example, the above-described program may be interpreted as an aspect of the invention of "a computer-readable medium storing a program."

"The computer-readable medium storing the program" represents a computer-readable medium storing a program, the medium which is used for, for example, installation and execution of the program, and distribution of the program.

For example, the storage medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a Blu-ray (registered trademark) disc; a magneto-optical disk (MO); a flexible disk (FD); a magnetic tape; a hard disk; a read only memory (ROM); an electrically erasable programmable ROM (EEPROM, registered trademark); a flash memory; a random access memory (RAM); a secure digital (SD) memory card; and the like.

The above-described program or a part of the program may be recorded in the storage medium, and may be stored and distributed. Also, the above-described program or a part of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be a part of other program, or may be recorded in a storage medium together with a different program. Alternatively, the program may be divided and recorded in plural recording media. Also, the program may be recorded in any form, for example, a compressed form or an encrypted form, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a memory configured to store information regarding a periodic bill including an overview section and at least one detailed section;
    a display configured to display:
        a first button, selectable by a user, configured to receive an instruction from the user to download the overview section;
        a second button, selectable by the user, configured to receive an instruction from the user to download the at least one detailed section; and
        a third button, selectable by the user, configured to receive an instruction from the user to download both the overview section and the at least one detailed section; and
    a processor configured to execute:
        a first generating unit configured to generate an overview file including the overview section before the user selects any of the first button, the second button, and the third button, without generating a detailed file including the at least one detailed section; and
        a second generating unit configured to generate, in response to the user selecting the second button or the third button, the detailed file including the at least one detailed section.

2. The information processing apparatus according to claim 1, wherein the second generating unit is configured to, in response to an amount of money corresponding to an item in the overview section or the at least one detailed section being higher than or equal to a threshold, generate the detailed file before the user selects the second button or the third button.

3. The information processing apparatus according to claim 2,
    wherein at least one of the overview section and the at least one detailed section is repeatedly generated and stored in the memory at intervals, and
    wherein the processor further comprises a calculating unit configured to adjust the threshold according to a previous amount of money corresponding to the item in a previous periodic bill.

4. An information processing apparatus comprising:
    a memory configured to store first information regarding a periodic bill indicating billing or payment of money regarding a user and second information regarding a previous periodic bill, the second information regarding the previous periodic bill having been generated and stored before the first information regarding the periodic bill during a previous period;
    a display configured to display a button selectable by a user, the button being configured to receive an instruction from the user to download the periodic bill; and
    a processor configured to execute:
        a first generating unit configured to, in response to a difference between a number of items or an amount of money corresponding to an item included in the periodic bill and the previous periodic bill being equal to or larger than a threshold, generate a file including the periodic bill before the user selects the button; and
        a second generating unit configured to, in response to the difference being smaller than the threshold, refrain from generating the file including the periodic bill until the user selects the button.

5. The information processing apparatus according to claim 4, wherein the processor is further configured to execute a setting unit configured to set the threshold according to a history of a number of items or an amount of money corresponding to an item included in a plurality of previous periodic bills.

6. A non-transitory computer readable medium storing a program causing a computer to execute a process for information processing, the process comprising:
    storing information regarding a periodic bill including an overview section and at least one detailed section;
    displaying, on a display:
        a first button, selectable by a user, configured to receive an instruction from the user to download the overview section;
        a second button, selectable by the user, configured to receive an instruction from the user to download the at least one detailed section; and
        a third button, selectable by the user, configured to receive an instruction from the user to download both the overview section and the at least one detailed section;

generating an overview file including the overview section before the user selects any of the first button, the second button, and the third button, without generating a detailed file including the at least one detailed section; and generating, in response to the user selecting the second button or the third button, the detailed file including the at least one detailed section.

7. A non-transitory computer readable medium storing a program causing a computer to execute a process for information processing, the process comprising:
   storing first information regarding a periodic bill indicating billing or payment of money regarding a user and second information regarding a previous periodic bill, the second information regarding the previous periodic bill having been generated and stored before the first information regarding the periodic bill during a previous period;
   displaying, on a display, a button selectable by a user, the button being configured to receive an instruction from the user to download the periodic bill;
   generating, in response to a difference between a number of items or an amount of money corresponding to an item included in the periodic bill and the previous periodic bill being equal to or larger than a threshold, a file including the periodic bill before the user selects the button;
   refraining from generating, in response to the difference being smaller than the threshold, the file including the periodic bill until the user selects the button.

8. An information processing method comprising:
   storing information regarding a periodic bill including an overview section and at least one detailed section;
   displaying, on a display:
      a first button, selectable by a user, configured to receive an instruction from the user to download the overview section;
      a second button, selectable by the user, configured to receive an instruction from the user to download the at least one detailed section; and
      a third button, selectable by the user, configured to receive an instruction from the user to download both the overview section and the at least one detailed section;
   generating an overview file including the overview section before the user selects any of the first button, the second button, and the third button, without generating a detailed file including the at least one detailed section; and
   generating, in response to the user selecting the second button or the third button, the detailed file including the at least one detailed section.

9. The information processing apparatus according to claim 1, wherein the second generating unit is configured to, in response to determining that the user has not selected the second button or the third button, refrain from generating the detailed file including the at least one detailed section.

10. The information processing apparatus according to claim 4, wherein the second generating unit is configured to, in response to the difference being smaller than the threshold and in response to determining that the user has not selected the button, refrain from generating the file including the periodic bill.

11. The non-transitory computer readable medium according to claim 6, wherein the process further comprises:
    determining whether the user has selected the second button or the third button; and
    in response to determining that the user has not selected the second button or the third button, refraining from generating the detailed file including the at least one detailed section.

12. The non-transitory computer readable medium according to claim 7, wherein the process further comprises:
    determining whether the user has selected the button; and
    in response to the difference being smaller than the threshold and in response to determining that the user has not selected the button, refraining from generating the file including the periodic bill.

13. The method according to claim 8, further comprising:
    determining whether the user has selected the second button or the third button; and
    in response to determining that the user has not selected the second button or the third button, refraining from generating the detailed file including the at least one detailed section.

14. The information processing apparatus according to claim 1,
    wherein the display is configured to display, in response to the overview file including the overview section being generated, the overview file including the overview section, and
    wherein the display is configured to display, in response to the detailed file including the at least one detailed section being generated, the detailed file including the at least one detailed section.

15. The information processing apparatus according to claim 4, wherein the display is further configured to display, in response to the file including the periodic bill being generated, the file including the periodic bill.

16. The non-transitory computer readable medium according to claim 6, wherein the process further comprises:
    displaying, in response to the overview file including the overview section being generated, the overview file including the overview section; and
    displaying, in response to the detailed file including the at least one detailed section being generated, the detailed file including the at least one detailed section.

17. The method according to claim 8, further comprising:
    displaying, in response to the overview file including the overview section being generated, the overview file including the overview section; and
    displaying, in response to the detailed file including the at least one detailed section being generated, the detailed file including the at least one detailed section.

18. The information processing apparatus according to claim 1,
    wherein the overview section comprises information indicating an overview of billing or payment relating to a product or service, and
    wherein the at least one detailed section comprises information relating to a specific usage situation of the product or service.

* * * * *